US009540024B2

(12) United States Patent
Iryami

(10) Patent No.: US 9,540,024 B2
(45) Date of Patent: Jan. 10, 2017

(54) COLLAPSIBLE SHOPPING CART

(71) Applicant: Rafael Iryami, Los Angeles, CA (US)

(72) Inventor: Rafael Iryami, Los Angeles, CA (US)

(*) Notice: Subject to any disclaimer, the term of this patent is extended or adjusted under 35 U.S.C. 154(b) by 0 days.

(21) Appl. No.: 14/819,364

(22) Filed: Aug. 5, 2015

(65) Prior Publication Data

US 2015/0336597 A1    Nov. 26, 2015

Related U.S. Application Data

(63) Continuation of application No. 13/728,952, filed on Dec. 27, 2012, now Pat. No. 9,145,155.

(51) Int. Cl.
  *B62B 3/02* (2006.01)
  *B62B 3/00* (2006.01)
  *B62B 3/14* (2006.01)

(52) U.S. Cl.
  CPC ............ *B62B 3/027* (2013.01); *B62B 3/002* (2013.01); *B62B 3/022* (2013.01); *B62B 3/1468* (2013.01); *B62B 3/146* (2013.01); *B62B 2205/20* (2013.01); *B62B 2206/04* (2013.01)

(58) Field of Classification Search
  CPC .......... B62B 3/144; B62B 3/14; B62B 3/1444; B62B 2501/067; B62B 5/085; B62B 5/082; B62B 3/027; B62B 1/12; B62B 3/02; Y10S 280/04
  See application file for complete search history.

(56) References Cited

U.S. PATENT DOCUMENTS 1,144,643 A * 6/1915 Elkins ................ B65D 37/00
                                          220/315
2,711,327 A * 6/1955 Stoll ..................... B62B 1/12
                                          280/652

(Continued)

*Primary Examiner* — Emma K Frick
(74) *Attorney, Agent, or Firm* — Payam Moradian

(57) ABSTRACT

A dynamic shopping cart is provided with collapsible walls. The shopping cart can either be used with the collapsible wall in place or in collapsed position. Disclosed is a personal shopping cart comprising: a) a platform with a front, a rear, a first side, a second side, and a top, the top of the platform defining a space for placing one or more items; b) three or more wheels for contacting the shopping cart with a ground; c) a first and a second post placed at the rear of the platform; d) a handle attached to the first post and the second post, a position of the handle defining the rear of the platform; e) a wall with four segments around the platform, with a rear wall segment, a first side wall segment, a second side wall segment, and a front wall segment, wherein the first side wall segment is pivotally attached to the first post, and the second side wall segment is pivotally attached to the second post, the first side and the second side wall segments configured to pivot towards the rear of the shopping cart, wherein the front wall segment is configured to be pivoted towards the platform so that the front wall segment rests on the platform; f) a first and a second bracket for attaching the first and the second a post to the platform, the first and the second post pivotally attached to the first and second bracket; wherein the shopping cart is collapsed by pivoting the first side wall segment, the second side wall segment, and the front wall segment, and then collapsing the shopping cart so that the first post and the second post pivot in relation to the bracket.

17 Claims, 19 Drawing Sheets

(56) References Cited

U.S. PATENT DOCUMENTS

| | | | | |
|---|---|---|---|---|
| 2,738,984 A * | 3/1956 | Korchan | B62B 1/12 | 280/652 |
| 2,782,047 A * | 2/1957 | Moran | B62B 1/12 | 280/654 |
| 2,891,802 A * | 6/1959 | Moran | B62B 1/12 | 220/6 |
| 3,166,339 A * | 1/1965 | Earley | B62B 1/147 | 280/47.26 |
| 3,191,956 A * | 6/1965 | Rizzuto | B62B 3/027 | 280/47.35 |
| 3,191,959 A * | 6/1965 | Heimbruch | B62B 3/02 | 280/33.991 |
| 3,388,920 A * | 6/1968 | Hill, Sr. | B62B 3/027 | 280/47.18 |
| 3,400,942 A * | 9/1968 | Hull | B62B 5/0083 | 280/35 |
| 3,774,929 A * | 11/1973 | Stanley | B62B 3/14 | 280/641 |
| 3,840,242 A * | 10/1974 | Craig, Sr. | B62B 3/186 | 280/33.996 |
| 3,840,243 A * | 10/1974 | Rheinhart | B62B 3/002 | 280/33.996 |
| 3,920,258 A * | 11/1975 | Lundstrom | B62B 3/186 | 280/33.996 |
| 4,049,284 A * | 9/1977 | Capper | B62B 1/042 | 220/6 |
| 4,346,906 A * | 8/1982 | Thorpe | B62B 3/025 | 280/33.996 |
| 4,346,907 A * | 8/1982 | Swann | B62B 1/12 | 280/47.18 |
| D280,039 S * | 8/1985 | Strayer | B62B 3/02 | D34/24 |
| 4,659,096 A * | 4/1987 | Leimgruber | B62B 3/02 | 280/39 |
| 4,678,090 A * | 7/1987 | Ross | B62B 3/186 | 211/150 |
| 4,726,602 A * | 2/1988 | Sanders | B62B 1/12 | 211/181.1 |
| 4,765,646 A * | 8/1988 | Cheng | B62B 3/022 | 280/651 |
| 5,294,158 A * | 3/1994 | Cheng | B62B 3/02 | 280/641 |
| 5,362,077 A * | 11/1994 | Adamson | B62B 3/1472 | 211/71.01 |
| 5,772,236 A * | 6/1998 | Clark | B62B 3/02 | 280/43 |
| 6,431,580 B1* | 8/2002 | Kady | B62B 1/12 | 280/655 |
| 6,955,365 B2* | 10/2005 | Giampavolo | B62B 1/12 | 229/117.09 |
| 7,367,571 B1* | 5/2008 | Nichols | B25H 1/12 | 280/47.131 |
| 7,392,993 B1* | 7/2008 | Prohl | A47F 5/137 | 280/33.998 |
| 7,726,669 B2* | 6/2010 | Alexander | A47B 37/00 | 280/47.131 |
| 8,109,477 B1* | 2/2012 | Blasbalg | B65F 1/004 | 248/101 |
| 8,408,581 B1* | 4/2013 | Hunter | B62B 3/027 | 280/33.993 |
| 8,733,786 B1* | 5/2014 | James | A47C 4/42 | 280/47.34 |
| 8,764,045 B1* | 7/2014 | Kossowsky | B62B 3/027 | 280/47.18 |
| 2002/0084629 A1* | 7/2002 | Levy | B62B 1/14 | 280/651 |
| 2002/0105169 A1* | 8/2002 | Dahl | B62B 1/002 | 280/651 |
| 2002/0167139 A1* | 11/2002 | Prather | B62B 3/027 | 280/47.35 |
| 2002/0171214 A1* | 11/2002 | Prather | B62B 3/027 | 280/47.35 |
| 2003/0011173 A1* | 1/2003 | Shall | A01K 97/22 | 280/651 |
| 2004/0222605 A1* | 11/2004 | Sterns | B62B 3/027 | 280/47.34 |
| 2005/0230936 A1* | 10/2005 | Van Horn | A45C 7/0022 | 280/641 |
| 2010/0283227 A1* | 11/2010 | Perelli | B62B 3/008 | 280/639 |
| 2014/0183844 A1* | 7/2014 | Iryami | B62B 3/027 | 280/659 |

* cited by examiner

COLLAPSIBLE SHOPPING CART

CROSS-REFERENCE

The present application claimed the benefit of and is a continuation of application Ser. No. 13/728,952, filed on Dec. 27, 2012, which is incorporated herein by reference in its entirety.

BACKGROUND SECTION OF THE INVENTION

People use personal shopping carts to carry their groceries and other items to their home. These personal shopping carts typically have a basket, a handle, and wheels. The personal shopping carts that are currently on the market have several drawbacks. First, they are very flimsy and hard to turn, making it difficult to push the cart. Second, the objects put in the shipping cart are limited by the size of the basket. Third, these shopping carts provide no means for carrying personal objects like a cell phone, or other items, such as clothing. There is a need in the art for a personal shopping cart that meets the needs of the ordinary person.

SUMMARY SECTION OF THE INVENTION

In one embodiment, provided is a personal shopping cart comprising: a platform with one or more sections, the top of the platform defining a space for placing one or more items; three or more wheels (preferably 4 wheels) a collapsible wall around some or all of the top of the platform; a handle; wherein the personal shopping cart can be used with the wall in place or the wall partially or fully collapsed to allow for placing objects that do not fit the platform with the collapsible wall in place. The platform can be made from a first and a second section, the first section surrounded by the collapsible wall, and the second section without a wall, the second section being next to the first section on opposite of the side where the handle is attached to the first section. Two of the wheels can be attached to the bottom of the second section of the platform. If the shopping cart has three wheels, one wheel can be placed in the center of the second section. The shopping cart can further comprise a foldable side bar attached to the side of the first section of the platform to allow for connecting segments of the collapsible wall. The collapsible wall can be comprised of four segments, with one segment of the collapsible wall connected between the handle posts, two segments of the collapsible wall each connected to one of the handle posts on one side and a side bar at the other side, and one segment of the collapsible wall connected to a side bar at one side and another side bar at another side. The connection to the side bars can be a detachable connection. The second section of the platform can be extendable to create a longer shopping cart. The front wall segment can be folded to fill a gap created by extending the second section of the platform. The segment of the collapsible wall that is attached between the two side bars can be folded to fill the gap. The segment of the collapsible wall that is attached to the handle posts may not be collapsible. The segment of the wall that is attached to the handle post and the side bar can be attached to the handle post via a pivoting hinge that allows for 90 degree rotation to be folded substantially parallel in relationship to the handle grip. The shopping cart can further comprise a tray attached to the handle. The shopping cart can further comprise an extendable coat hanger attached to the handle. The bottom of the platform can contain several receptacle holes to accept straps to hold items on top platform. When some or all of the wall is collapsed, the cart can be folded. The cart can include a chassis axle encompassing the two wheels that are placed below the handle posts. The chassis axle can allow for placing the foot on the axle to apply a force to lift front end of the shopping cart.

A personal shopping cart comprising: a platform for placing items having a first and second section, with the first section of the platform having an area that is larger than the second platform, and the second platform placed next to the first platform and capable of extending away from the first platform to create an extended platform, two wheels attached to bottom of the second platform, two wheels attached to the bottom of the first platform on opposite side of where the second platform is situated next to the first platform, a partially collapsible wall made from four segments around the first platform, with three segments of the wall being collapsible, a handle comprised of a horizontal grip attached to two vertical posts that are attached to the first platform on opposite side of where the second platform is placed in relation to the first platform, with a segment of the wall that is not collapsible attached to the two posts, two foldable side bars placed apart on the side of the first platform for detachably attaching segments of the collapsible wall, wherein the personal shopping cart can be used with the wall in place or the wall partially collapsed to allow for placing objects that do not fit the platform with the collapsible wall in place.

DETAILED DESCRIPTION OF THE INVENTION

The present invention provides a shopping cart that solves the many drawbacks of personal shopping carts designed for carrying items. The shopping cart has a collapsible wall that allows for putting in items of various sizes. The wall can be collapsed for example by folding one or more wall segments or removing them. The shopping cart has an extendable platform. The shopping cart is also stable with a chassis and an axle. The shopping cart is designed to further include a coat hanger, a cup holder, and a tray for placing small objects.

Figure 1:
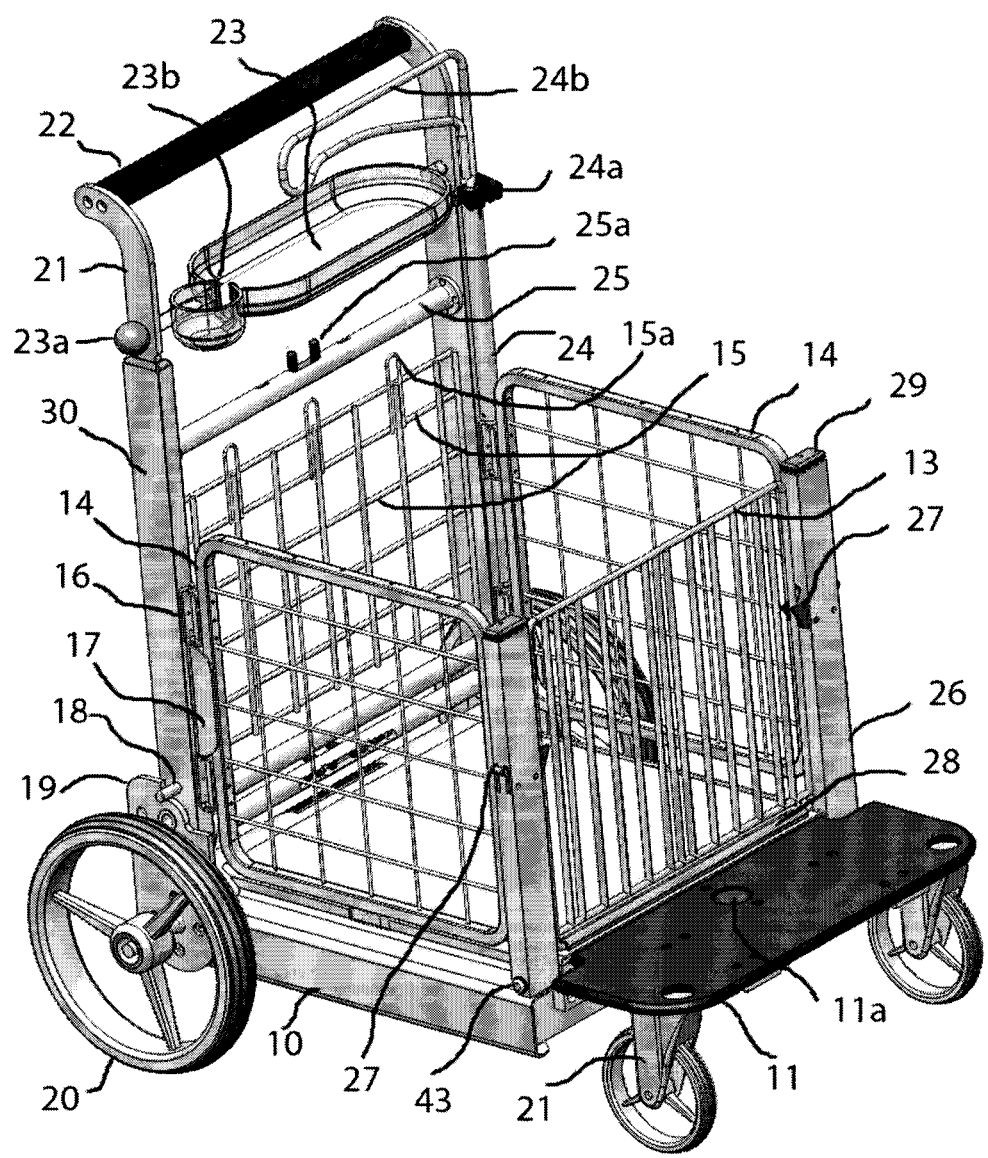
FIG. 1 is an illustration of an isometric front view of the SC.
Figure 16:
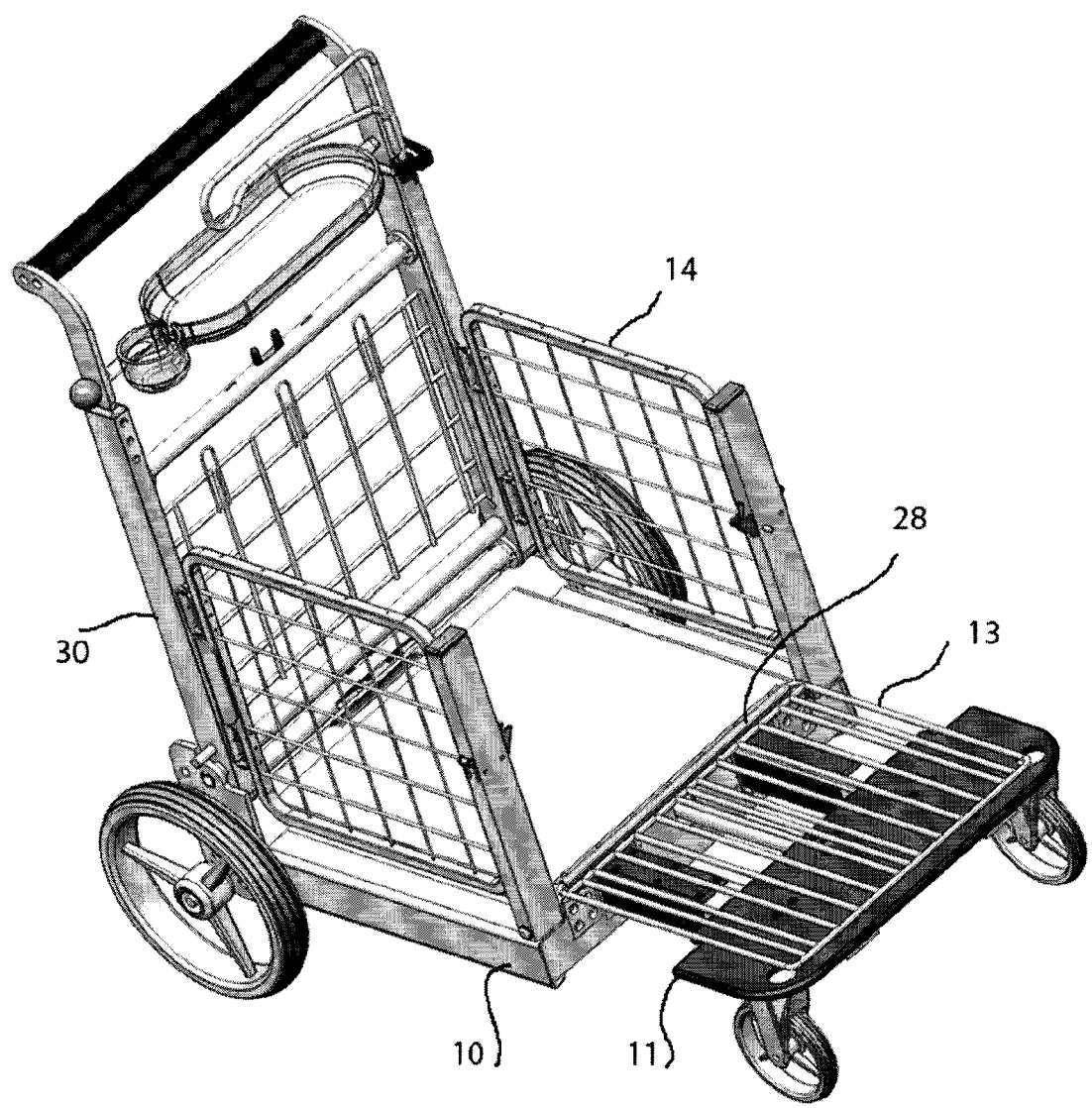
FIG. 16 is an illustration of the pivoted front wall at extended position.

In one embodiment, the shopping cart is used as illustrated in FIG. 1. In this embodiment, the collapsible wall made from the four wall segments (13, 14 left and right side, 15) is kept in place, and items are put in the basket formed by the collapsible wall. It is possible to use the cart with 1) all the wall segments, particularly (13) and (14) folded, 2) just one of the side wall segments (14) folded, 3) both side wall segments (14) folded, 4) or just the front wall segment (13) folded. In another embodiment, as illustrated in FIG. 16, the front extension platform (11) is extended and the front wall segment (13) is folded to fill the gap. This embodiment (with front wall segment (13) folded) can be used with side wall segments 14 (and/or back wall 15) in a collapsed/folded position or in place. The shopping cart can have an optional hanger (24b) that can be extended.

FIG. 1 illustrates a front view of the shopping cart with the collapsible wall in place. The chassis (10) forms a platform for placing items. In front of the chassis and away from handle (22), there is a front extension platform (11). The front extension platform (11) allows for extending the overall of the shopping cart. The front extension platform (11) can be secured and extended as desired. A mechanism similar to the front extension latch release push button (11a) can be used to extend the front extension platform ("FEP") (11). The FEP (11) can be placed next to the shopping cart on one of its long sides. The FEP (11) can have round edges and be attached to wheels through one or more of front rotatable caster (21). In one embodiment, one wheel is placed on each side of the FEP. These two wheels (one on each side), along with two wheels (20) placed below the main platform (10) can comprise the four wheels of the shopping cart. If the shopping cart has three wheels, the one wheel can be placed in the middle of the FEP.

The main platform (10) can have four wall segments, front wall segment (13), side wall segments (left or right) (14), and a rear wall segment (15). A triangular design with three wall segments can also be made. As illustrated, the front wall segment (13) and the side wall segments (14) are collapsible. The rear wall segment (15) is not collapsible in the embodiment that is illustrated. The rear wall segment can include one or more hooks (15a) for securing items. The side wall segments are pivotally attached to the side wall hinge (16) that allows for a 90 degree rotation so that the side wall segments be substantially parallel to the rear wall segment (15) or the handle (22). The side wall can have a stop bracket (17) to stop the side wall from rotating more than 90 degrees and to maintain the side wall segment parallel to the side of the main platform (10). The front wall segment (13) can be attached with a front wall pivot mounting hinge (28) at the bottom that allows the front wall to pivot 180 degrees to rest at the top of the main platform and or in the opposite forward position to create an extended platform. The front wall latch (27) keeps the front wall segment (13) at 90 degrees and from falling forward.

The cart can have two side wall support posts (side bars) (26) placed at the corner of the chassis (10) away from the handle. The side wall support posts (side bars) (26) are foldable if needed and they support the front and side wall segments when in position. The side wall support posts (side bars) (26) can be folded with a side wall latch release knob (Pull release knob) (29).

The cart has a handle that comprises various components. The hand grip (22) can be a horizontal component attached to two substantially vertical components, handle posts (30) on each side of the cart. A handle pivot stop pin (18) can be used along with a handle pivot stop bracket (19) to keep the handle from falling out. The height of the handle can be adjusted. Handle bar height adjustment squeeze latch (25) with squeeze knobs (25a) can be used to adjust the height of the handle (22).

The handle can include a drink (cup) holder tray (preferably tilt adjustable) (23), a tray lock knob (23a) for adding or removing the tray, and a drink holder (23b). The drink holder (23b) can be incorporated separately from the cart.

The cart can have a telescopic coat hanger hook (24) that can be extendable and/or rotatable. The hood (24b) can be used to hold hangers. A clamp (24a) can be used to adjust the coat hanger rotation and height. The inner member of telescopic body of the hanger (24) can extend in a parallel fashion to one of the handle posts (30).

Figure 2:
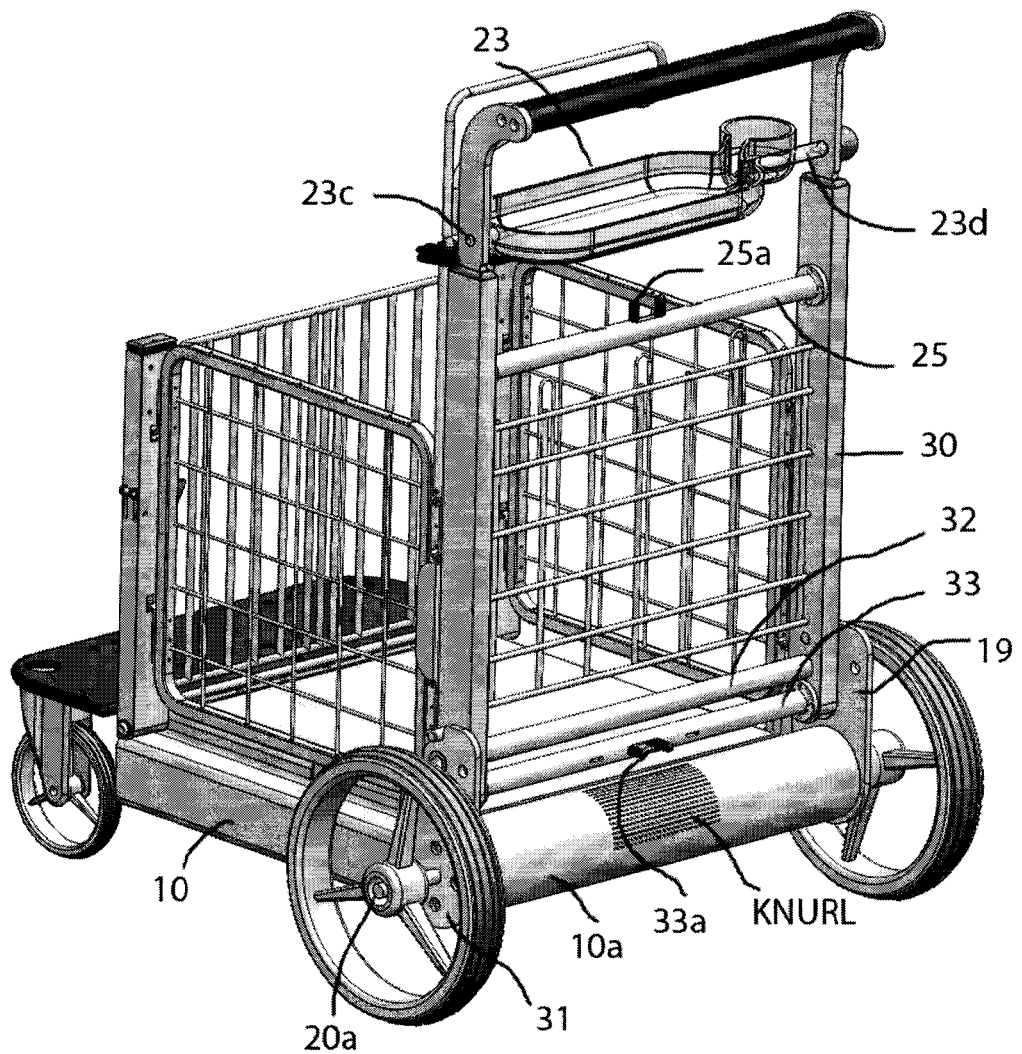
FIG. 2 is an illustration of an isometric rear view of the SC.

FIG. 2 provides the rear view of the cart. Chassis (10) forms a platform. There can be a chassis axle (10a) connecting the two rear wheels. The chassis can have a knurl. FIG. 2 also illustrates the handle pivot stop bracket (right) (19), drink holder tray (tilt adjustable) (23), tray pivot pin, left (23c), tray pivot pin, right (23d), handle bar height adjustment squeeze latch (25), squeeze knobs (25a), handle post, right side (30), handle fold pivot shaft (32), handle fold/unfold squeeze latch (33), and squeeze knobs (33a).

Figure 3:
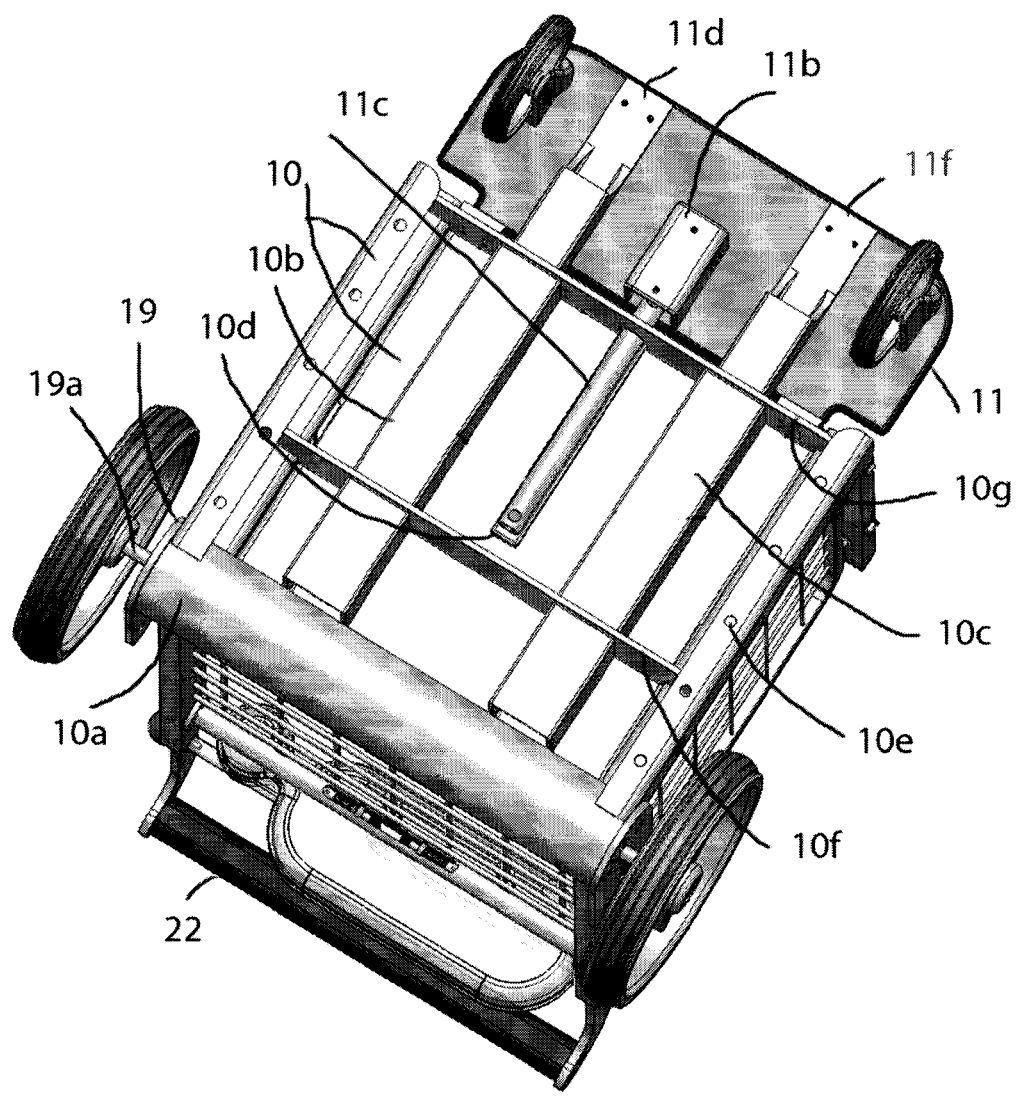
FIG. 3 is an illustration of an isometric bottom view.

FIG. 3 illustrates the bottom isometric view. FIG. 3 shows the chassis (10) and chassis axle (10a). FIG. 3 also illustrates one particular example for connecting the front extension platform to the main platform. The bottom of the main platform has front extension receptacle tubes (10b and 10c) for receiving front extension plug tubes (11d and 11f) from the front extension platform.

The front extension latch mounting bracket (11b), latch extension rod (11c), and front extension latch keeper bracket (10d) allow for reversibly locking the front extension platform (11) in place at a desired position. The cart can have several elastic band hooks attachment hole (10e) for attaching, for example, elastic bungee cords with hooks to secure items on the top of main platform. Platform support rib (10f) supports some of the weight put on the platform. Additional features shown in FIG. 3 include platform end cap (10g), front extension plug tube, left (11f), handle pivot stop bracket (right) (19), wheel shaft (19a), and handle grip (22).

Figure 4:
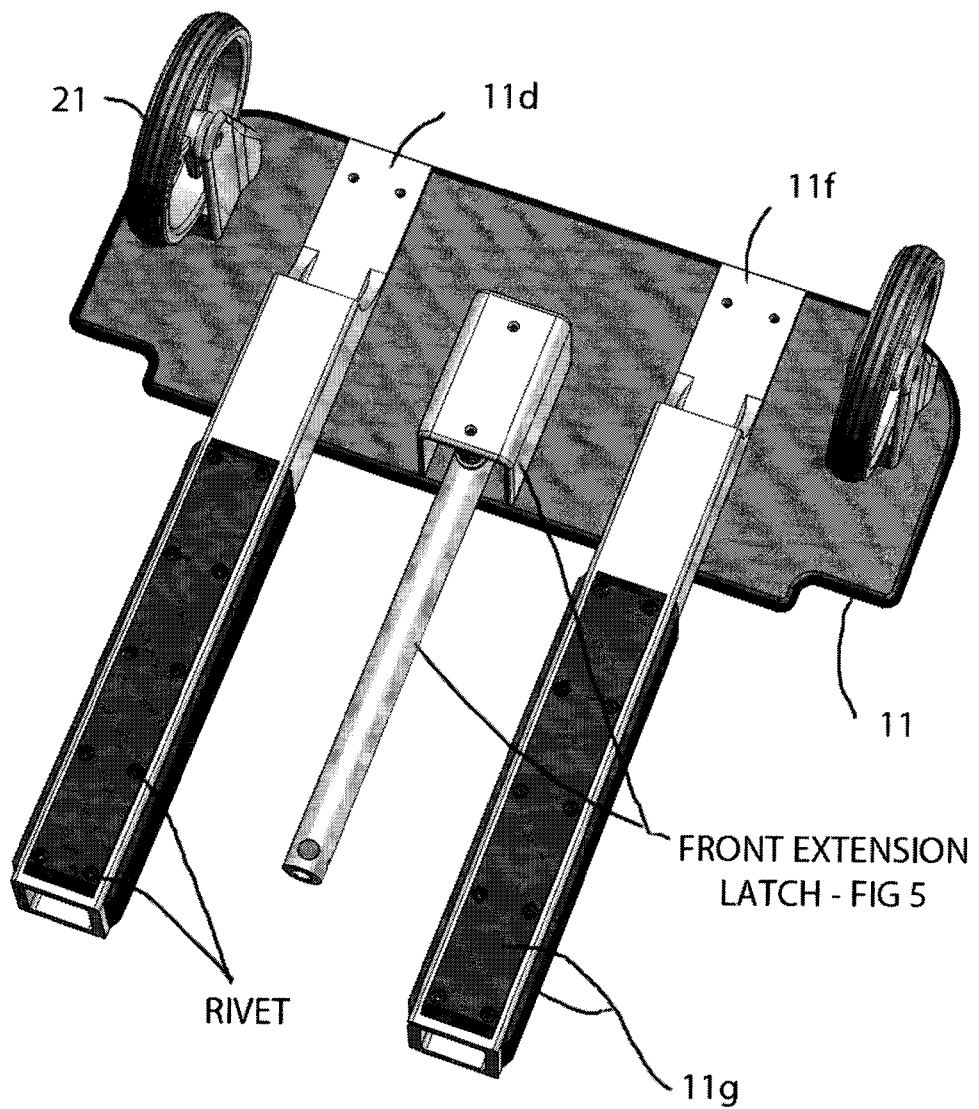
FIG. 4 is an illustration of a front extension isometric bottom view.

FIG. 4 is a front extension isometric bottom view of the shopping cart. FIG. 4 shows front extension platform (11), front extension plug tube (11d, and 11f), plug tube bearing pads (11g), and front rotatable caster (21).

Figure 5:
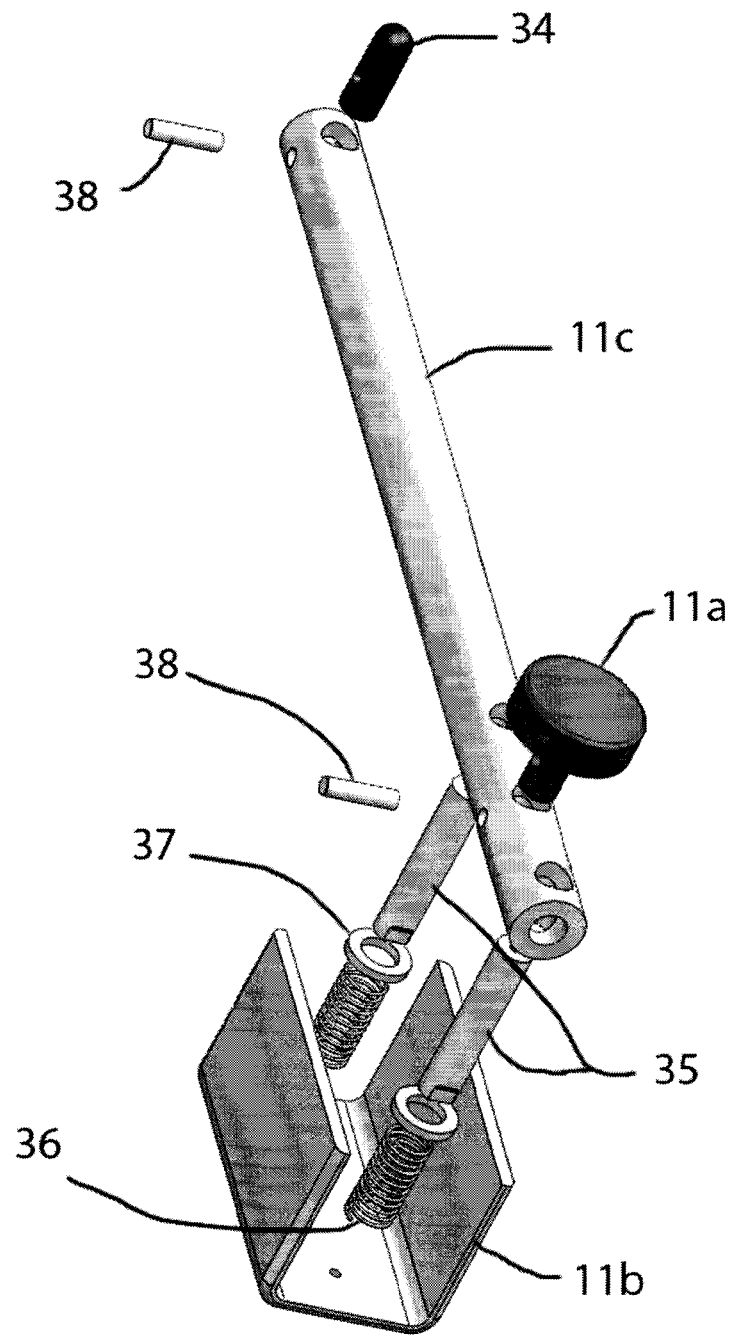
FIG. 5 is an illustration of a front extension latch exploded view.

FIG. 5 is an illustration of a front extension latch in exploded view. FIG. 5 shows a front extension latch release push button (11a), front extension latch mounting bracket (11b), latch extension rod (11c), position lock pin (34), latch extension rod elevator shafts (35), compression spring (36), spring trust washer (37), and press fit keeper pin (38).

Figure 6:
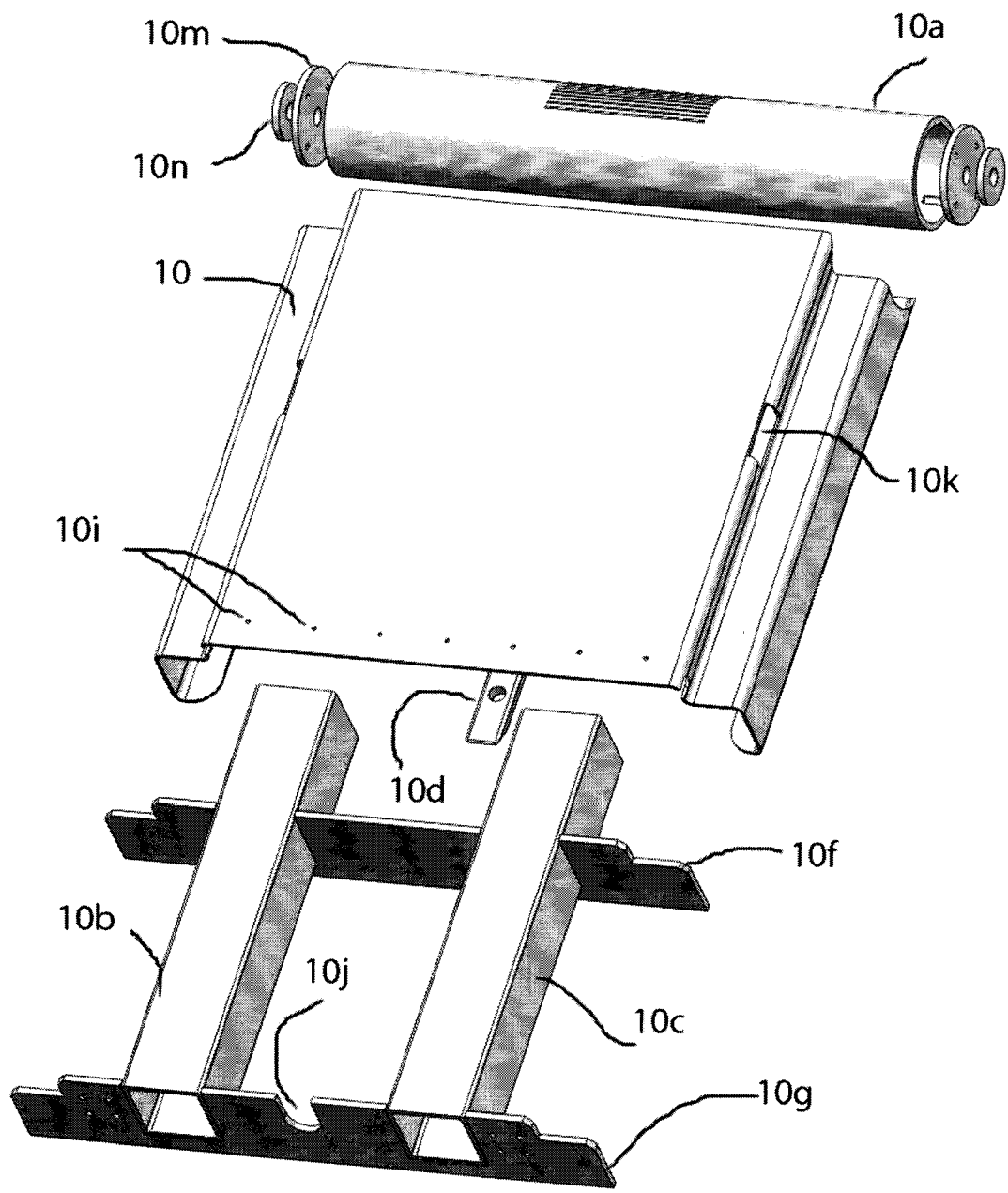
FIG. 6 is an illustration of a chassis weldment exploded view.

FIG. 6 is an illustration of a chassis weldment exploded view. FIG. 6 shows chassis (platform) (10), chassis axle (10a), front extension receptacle tube, right (10b), front extension receptacle tube, left (10c), front extension latch keeper bracket (10d), platform support rib (10f), platform end cap (10g), front wall pivot hinge mounting holes (10i), front extension latch rod clearance slot (10j), side wall support bar latch receptacle slot (10k), axle end cap (10m), and axle end cap spacer washer (10n). The platform (10) can have sides with lower height (a slight dip) where the side wall support posts (side bars) (26) are attached. The difference in height between the platform and the dips on the sides allows for obtaining a single platform that is level when the side wall support post (side bar) (26) is folded. The side wall support post (side bar) can be kept in place by detachably attaching the side bar to the side wall support bar latch receptacle slot (10*k*).

Figure 7:
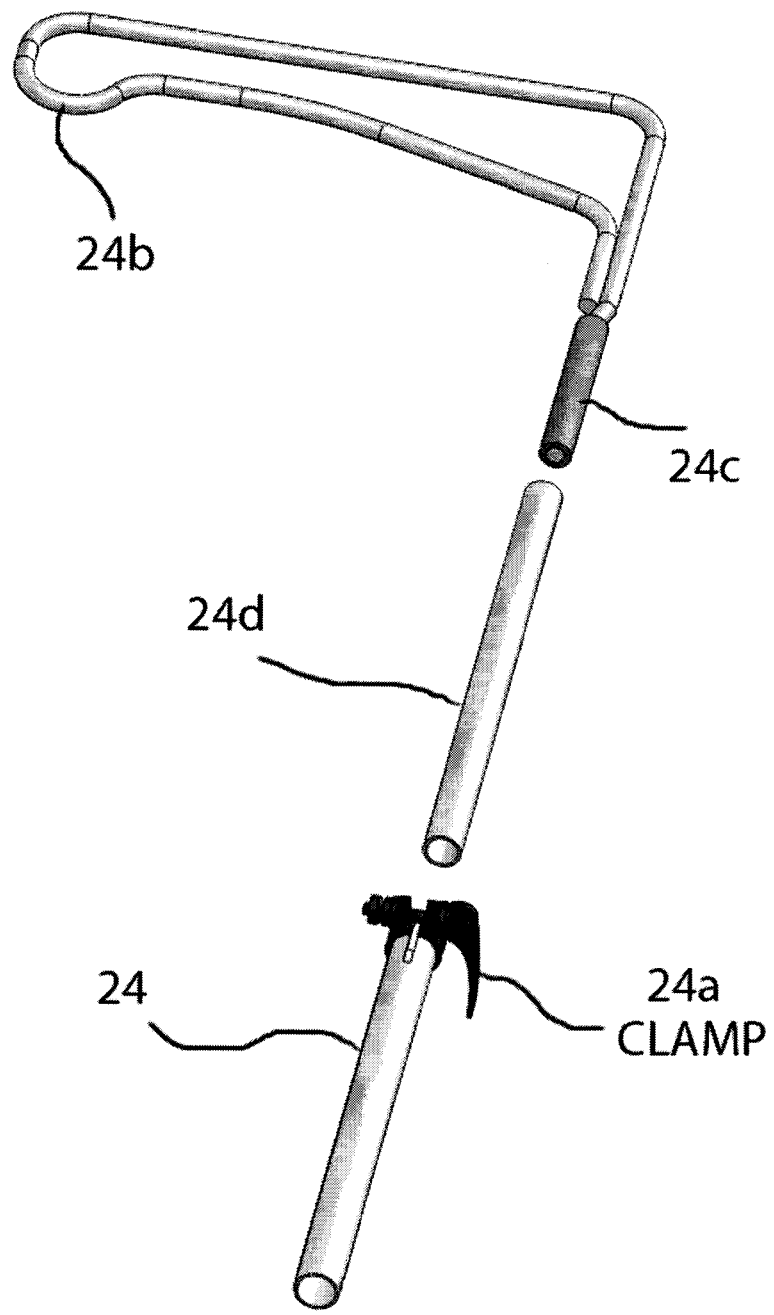
FIG. 7 is an illustration of a coat hanger exploded view.

FIG. 7 is an illustration of a coat hanger in exploded view. FIG. 7 shows telescopic outer tube (24), height adjustment clamp (24*a*), hook (24*b*), hook ferrule (press fit with 24*d* and 24*b*) (24*c*), and telescopic inner tube (24*d*). The coat hanger can be attached to the handle post via outer telescopic tube (24).

Figure 8:
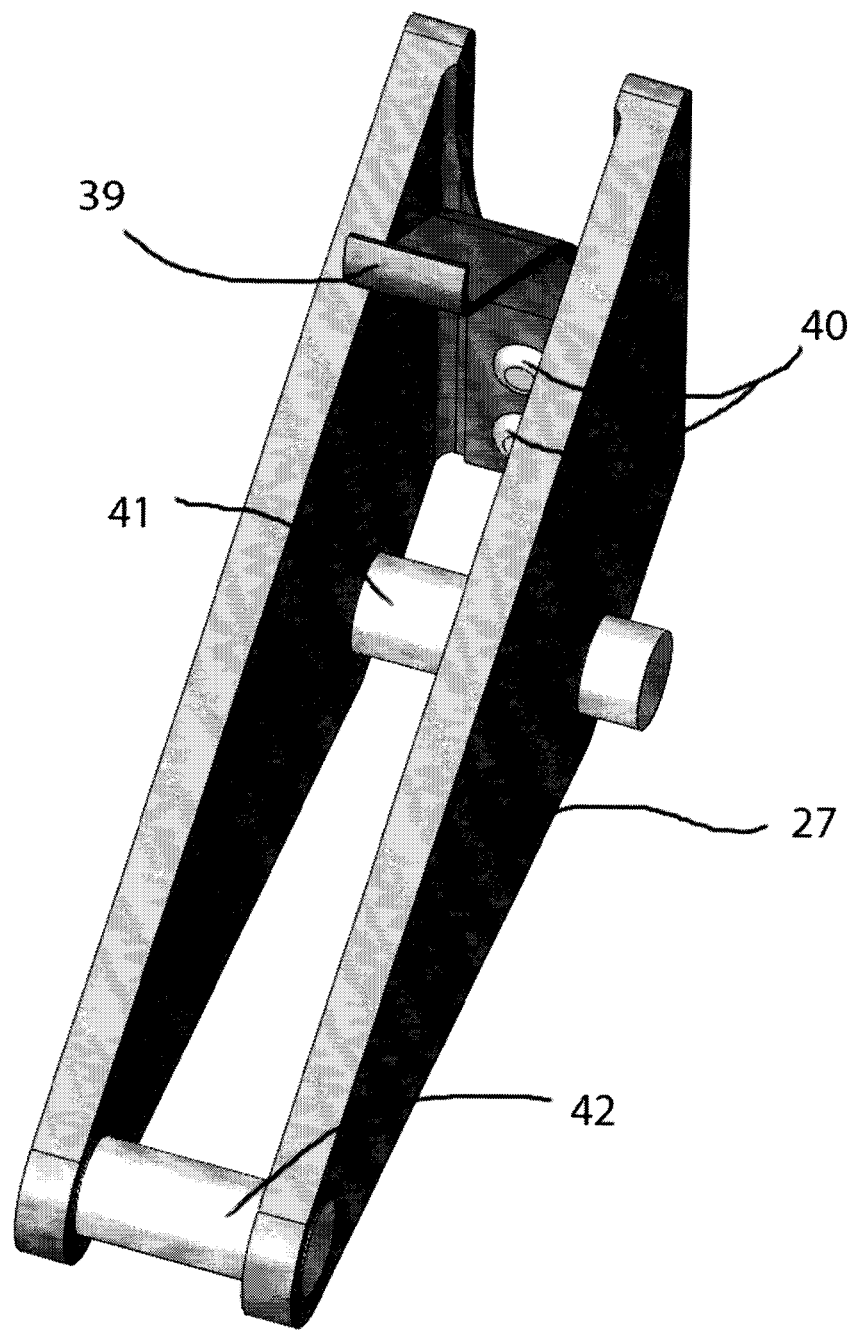
FIG. 8 is an illustration of a front wall locker latch.

FIG. 8 is an illustration of a front wall locker latch. FIG. 8 shows front wall latch receptacle bracket (27), tension leaf spring (39), leaf spring mounting rivets (40), latch pivot pin (press fit to 27) (41), and latch lever pin (press fit to 27) (42).

Figure 9:
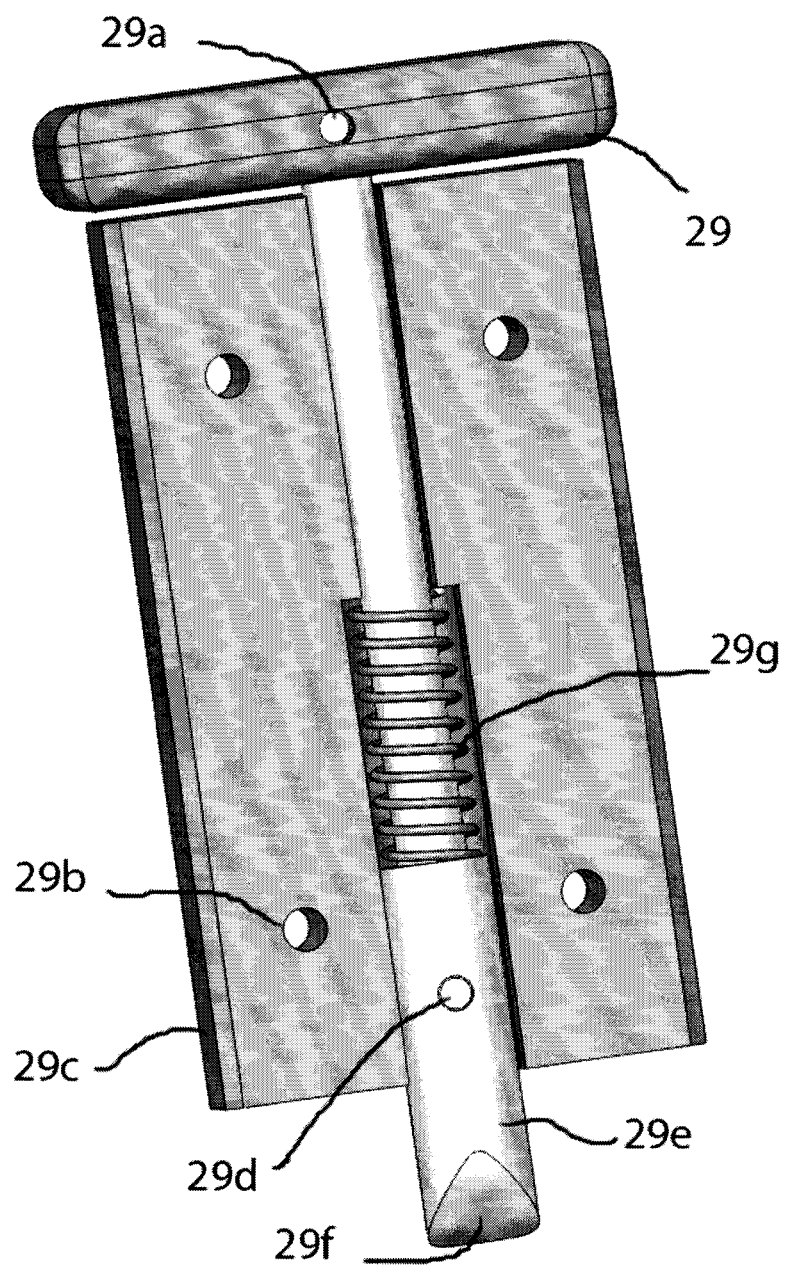
FIG. 9 is an illustration of a sidewall support post latch front view.

FIG. 9 is an illustration of a sidewall support post latch, front view. FIG. 9 shows side wall latch release knob (pull release knob) (29), press fit keeper pin (29*a*), side bar mounting hole (29*b*), latch mounting block (29*c*), latch rod travel limiter pin (see FIG. 10) (29*d*), latch rod (29*e*), and compression spring (29*g*).

Figure 10:
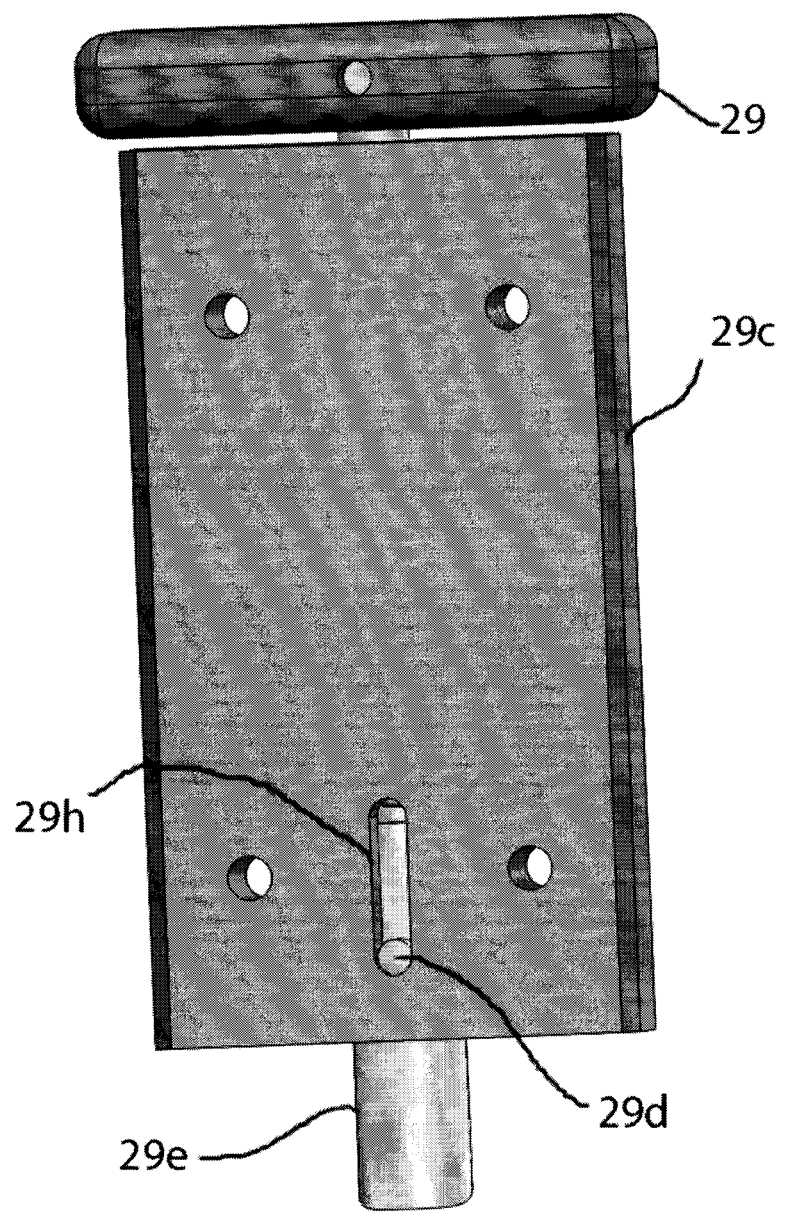
FIG. 10 is an illustration of a sidewall support post latch, rear view.

FIG. 10 is an illustration of a sidewall support post latch, rear view. FIG. 10 shows side wall latch release knob (pull release knob) (29), latch mounting block (29*c*), latch rod travel limiter pin (see FIG. 9) (29*d*), latch rod (29*e*), and latch rod travel limiter slot (29*h*).

Figure 11A:
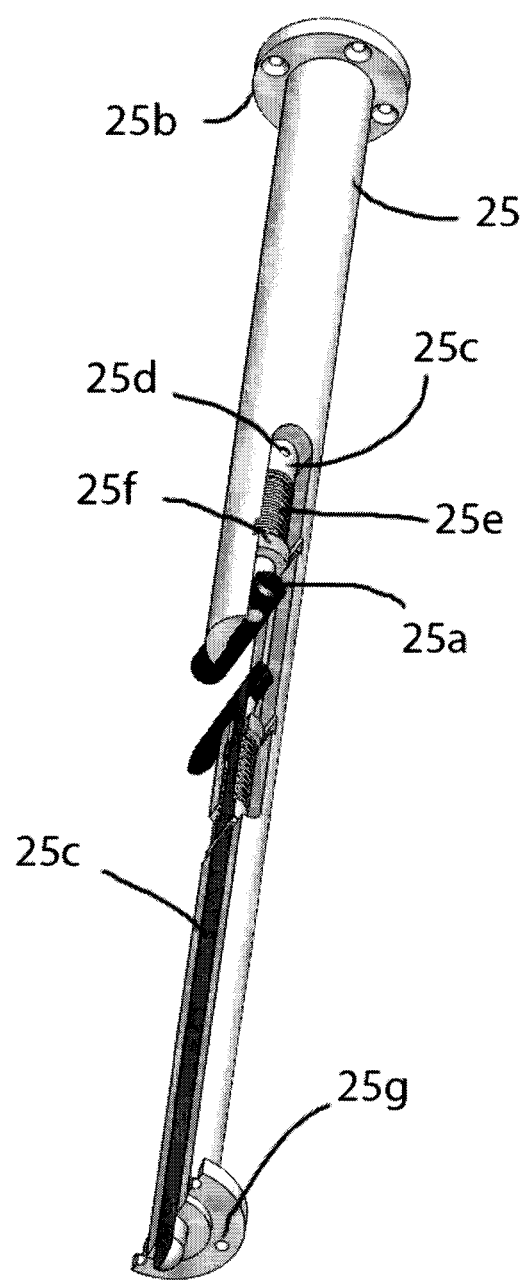
FIG. 11A is an illustration of a handle height adjustment latch partial cross section, bottom view.

FIG. 11A is an illustration of a handle height adjustment latch (25) partial cross section, bottom view. FIG. 11A illustrates handle bar height adjustment squeeze latch 25, squeeze knob (25*a*), latch mounting flange (25*b*), latch rod (25*c*), latch rod travel limiter pin (25*d*), compression spring (25*e*), latch rod spring retaining ring (25*f*), and flange mounting hole (25*g*).

Figure 11B:
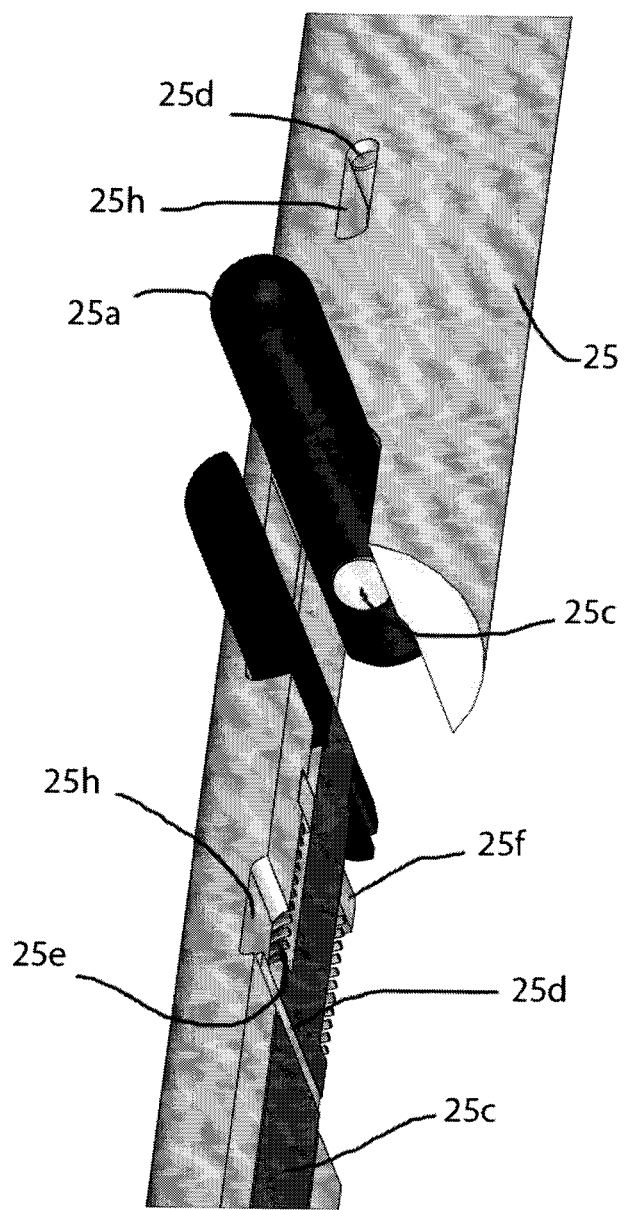
FIG. 11B is an illustration of a handle height adjustment latch partial cross section, top view.

FIG. 11B is an illustration of a handle height adjustment latch (25) partial cross section, top view. FIG. 11B shows handle bar height adjustment squeeze latch (25), squeeze knob (25*a*), latch rod (25*c*), latch rod travel limiter pin (see FIG. 11A) (25*d*), compression spring (25*e*), latch rod spring retaining ring (25*f*), and latch rod travel limiter slot (25*h*).

Figure 12:
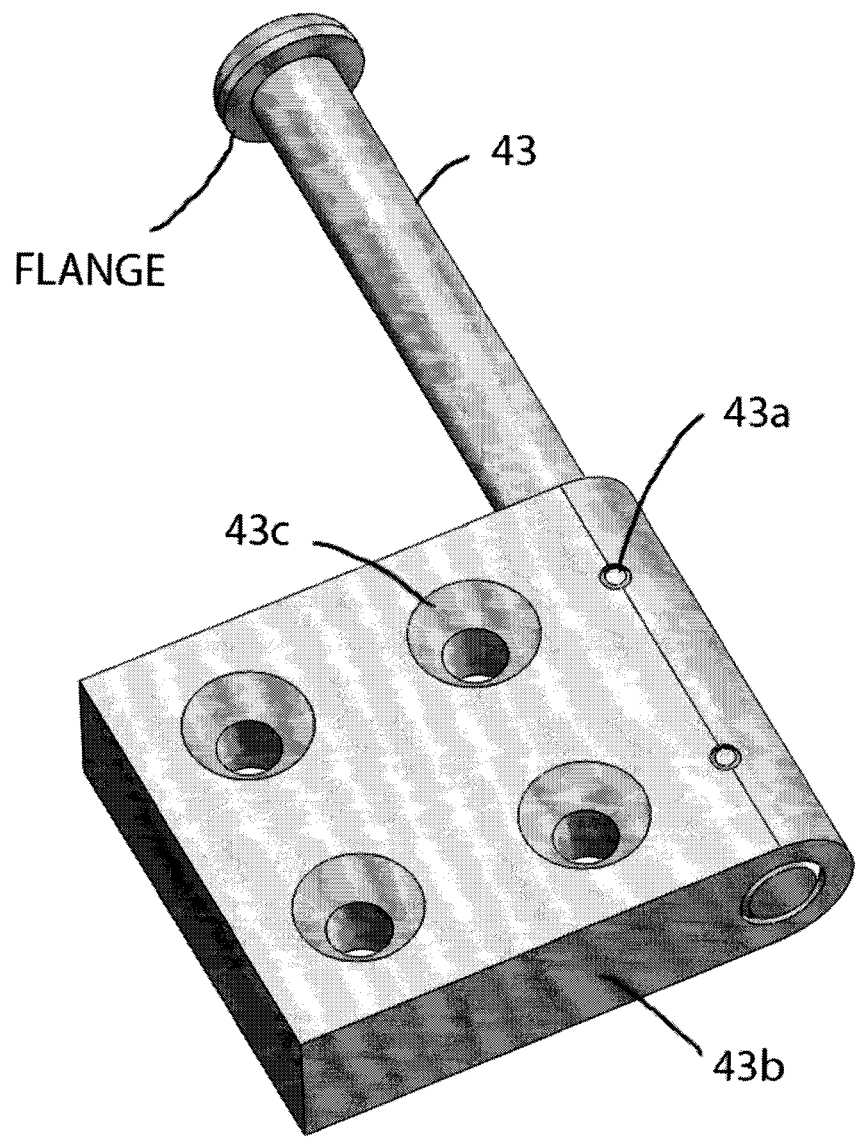
FIG. 12 is an illustration of a side wall support bar mounting hinge.

FIG. 12 is an illustration of a side wall support bar hinge. FIG. 12 shows side wall support bar pivot block (43) (which can have a rod with a flange at one end), press fit mounting pin (43*a*), side wall support bar mounting bracket (43*b*), and pivot block mounting hole (43*c*).

Figure 13:
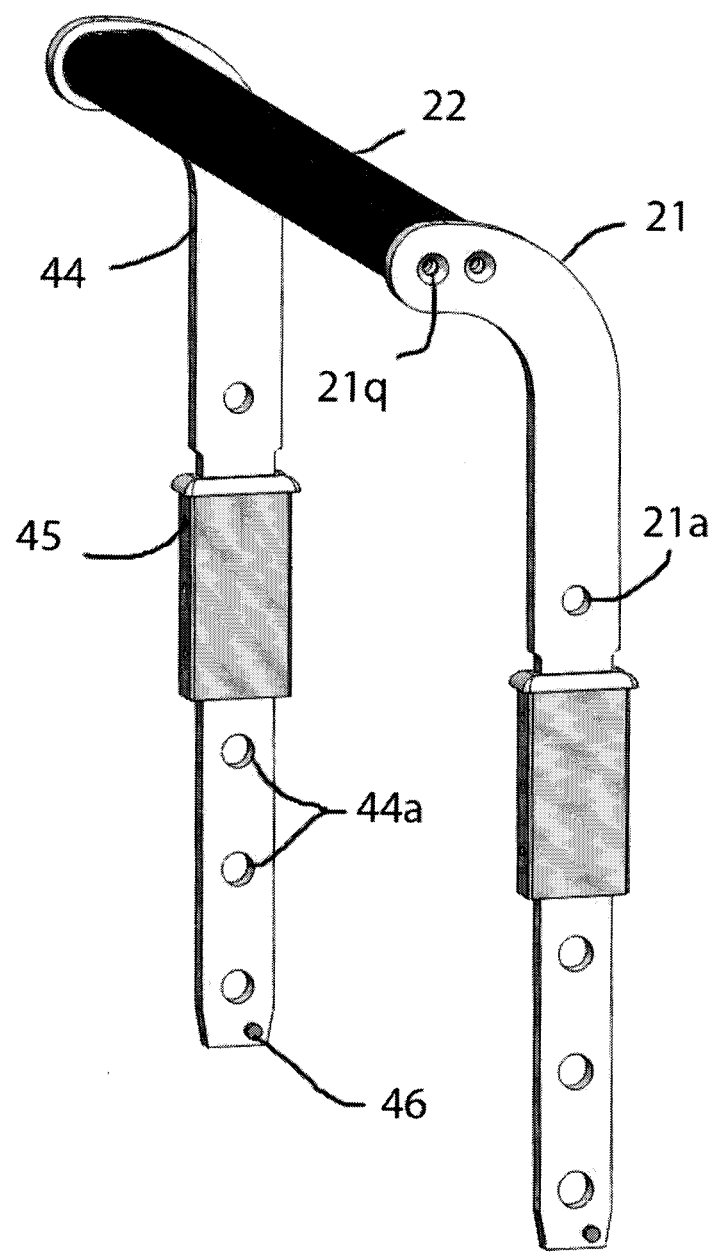
FIG. 13 is an illustration of a handle crossbar.

FIG. 13 is an illustration of a handle crossbar. FIG. 13 shows handle grip adjustable support, right (21), tray pivot mounting hole (21*a*), mounting hole (21*q*), handle grip (22), handle grip adjustable support, left (44), handle height adjustment holes (44*a*), handle bar mounting/bearing block (45), and handle bar retainer pin (press fit) (46).

Figure 14:
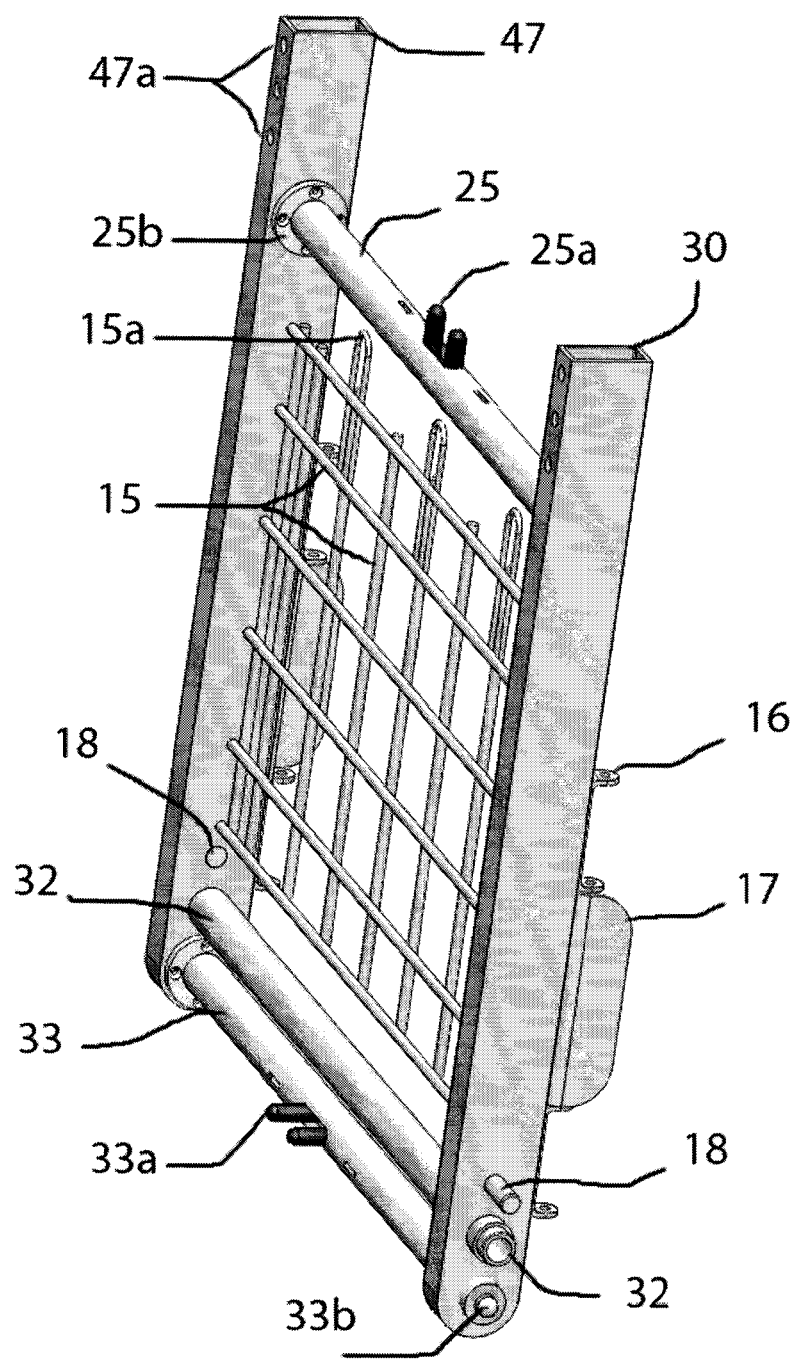
FIG. 14 is an illustration of a handle.
Figure 15A:
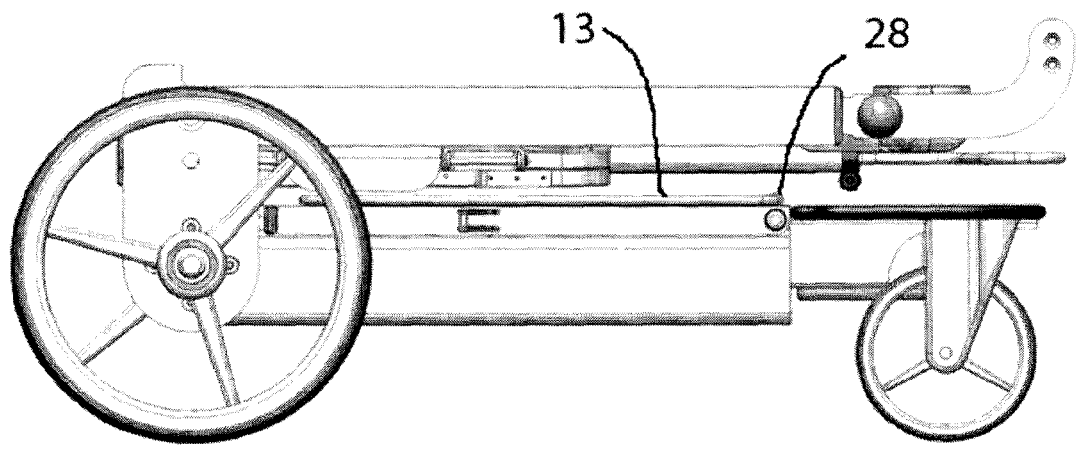
FIGS. 15 (A-F) is an illustration of different views of the shopping cart in a folded position.
Figure 15B:
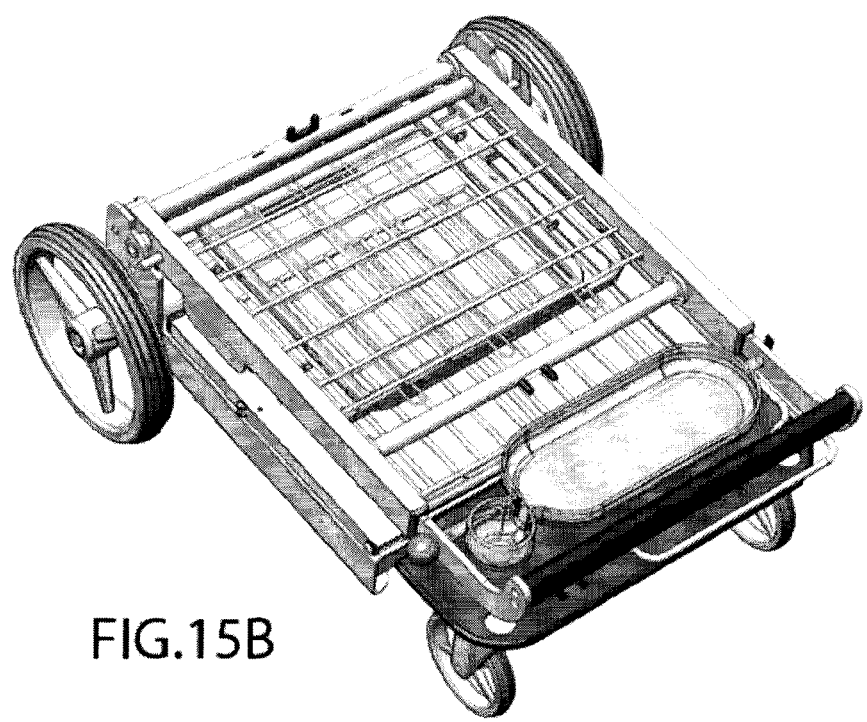
Figure 15C:
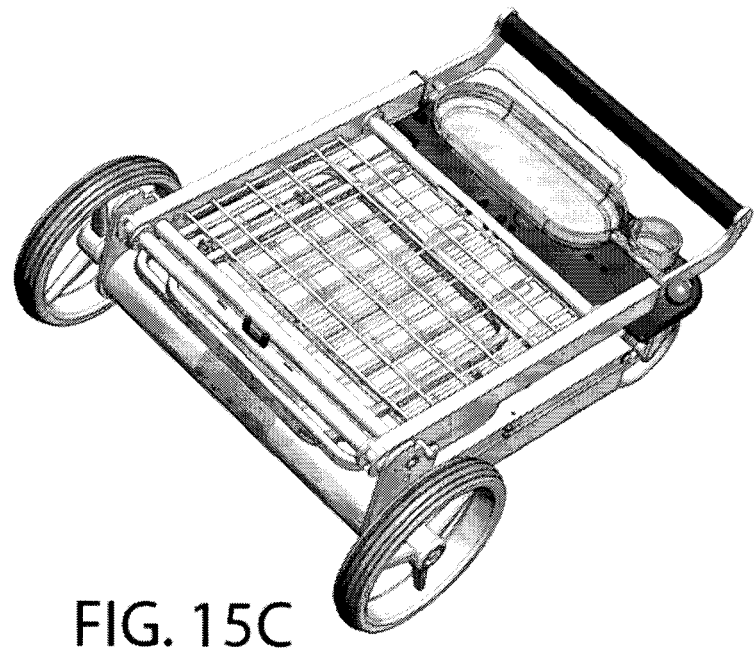
Figure 15D:
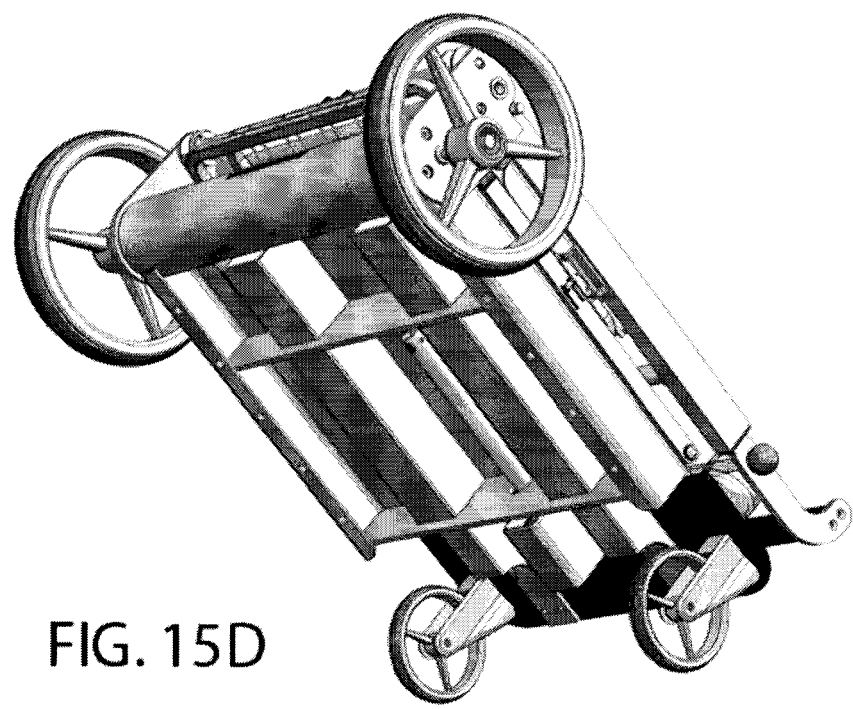
Figure 15E:
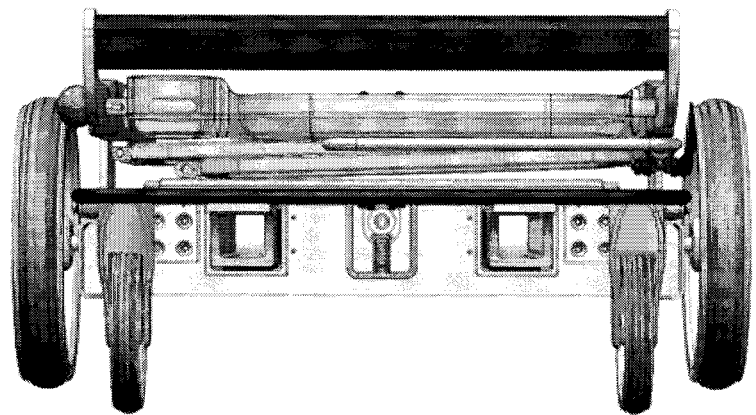
Figure 15F:
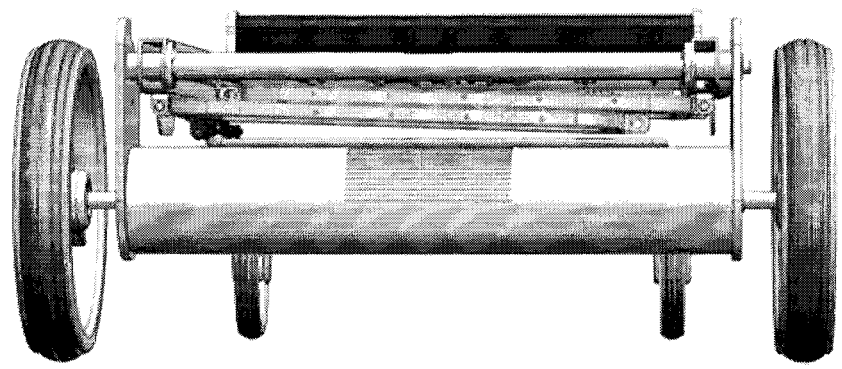

FIG. 14 is an illustration of a handle. FIG. 14 shows Rear wall (15). FIG. 14 shows rear wall shopping bag hook (15*a*), side wall mounting hinge (16), side wall stop bracket (17), handle pivot stop pin (18), handle bar height adjustment squeeze latch (25), squeeze knob (25*a*), latch mounting flange (25*b*), handle post, right side (30), handle fold pivot shaft (32), handle fold/unfold squeeze latch (33), squeeze knobs (33*a*), latch rod fold/unfold lock (33*b*), handle post, left side (47), and handle cross bar mounting holes (47*a*).

FIGS. 15 (A-F) are different views of the shopping cart in various folded illustrations. The shopping cart can be folded into a position where the handle posts (30) are substantially parallel to the sides of the main platform (10). To fold the shopping cart, it is preferred that the main platform (10) and the FEP (11) are next to each other (non-extended position). It is also preferred that the side and front wall segments, as well as the side bars, are in a collapsed position.

The personal shopping cart is preferably pushed with a handle in front of a person. The main platform (10) is preferably placed in the front of the person pushing the cart, and the front extension platform (11) is placed further in front of the main platform (10). The main platform (10) preferably has four sides. The handle posts (3) are attached to one side of the main platform (10) (two adjacent corners) and the front extension platform the other side (two adjacent corners) opposite of the side covered by the handle posts.

The top surface of either platform (10, 11) is preferably from about 6 inches to about 12 inches, such as about 8 inches, above the ground. The distance between the two posts of the handle (the length of the handle grip) is preferably about 18 to about 25 inches, such as about 21 inches. The height of each segment of the collapsible wall is preferably about 15 to about 19 inches, such as about 17 inches. The width of each segment of the collapsible wall is preferably the same or slightly less than the length of the handle grip.

What is claimed is:

1. A personal shopping cart comprising:
   a) a platform with a front, a rear, a first side, a second side, and a top, the top of the platform defining a space for placing one or more items;
   b) three or more wheels for contacting the shopping cart with a ground;
   c) a first and a second post placed at the rear of the platform;
   d) a handle attached to the first post and the second post, a position of the handle defining the rear of the platform;
   e) a wall with four segments around the platform, with a rear wall segment, a first side wall segment, a second side wall segment, and a front wall segment, wherein the first side wall segment is pivotally attached to the first post, and the second side wall segment is pivotally attached to the second post, the first side and the second side wall segments configured to pivot towards the rear of the shopping cart, wherein the front wall segment is configured to be pivoted towards the platform so that the front wall segment rests on the platform;
   f) a first and a second bracket for attaching the first and the second post to the platform, the first and the second post pivotally attached to the first and second bracket; two of the wheels each attached to the platform with a fastener through an opening in the brackets;
   wherein the shopping cart is collapsed by pivoting the first side wall segment, the second side wall segment, and the front wall segment, and then collapsing the shopping cart so that the first post and the second post pivot in relation to the bracket.

2. The shopping part of claim 1, further comprising a first and a second side bar pivotally attached to the platform, the first side bar connecting the front wall segment with the first side wall segment, and the second side bar connecting the front wall segment with the second side wall segment wherein the first and the second side bars are, configured to be pivoted towards the platform to allow for collapsing the shopping cart.

3. The shopping cart of claim 1, wherein the shopping cart has four wheels.

4. The shopping cart of claim 1, wherein the top of the platform is 6 inches to 12 inches above the ground.

5. The shopping cart of claim 1, further comprising two foldable side bars attached to the platform to allow for connecting one or more segments of the wall.

6. The shopping cart of claim 1, wherein the rear wall, segment is not collapsible with respect to the first and the second post.

7. The shopping cart of claim 1, wherein the each side wall segment is attached to each post via a pivoting hinge that allows for 90 degree rotation to allow for pivoting the segment substantially parallel to the handle.

8. The shopping cart of claim 1, further comprising a tray attached to the handle.

9. The shopping cart of claim 1, further comprising an extendable coat hanger attached to the handle.

10. The shopping cart of claim 1, wherein a bottom of the platform contains one or more receptacle holes to secure items with strap hooks.

11. The shopping cart of claim 1, further comprising a chassis axle.

12. The shopping cart of claim 11, wherein the chassis axle allows for engaging the axle to, apply a force to lift the front end of the platform.

13. The shopping cart of claim 1, wherein the handle is oriented so as to be pushed by a user standing behind the shopping cart.

14. The shopping cart of claim 1, wherein each of the brackets is attached in proximity to a corner of the platform.

15. The shopping cart of claim 1, wherein each bracket has a first end and a second end, the first end of the bracket attached to the first and second post, with one bracket attached to one post, the second end of each bracket attached to the platform, with the each of the two brackets placed on an opposite side of the platform.

16. The shopping cart of claim 1, further comprising a pivot stop pin to limit pivoting of the handle in a backward direction.

17. A personal shopping cart comprising:
   a) a platform with a front, a rear, a first side, a second side, and a top, the top of the platform defining a space for placing one or more items;
   b) three or more wheels for contacting the shopping cart with a ground;
   c) a handle attached to the platform, a position of the handle defining the rear of the platform;
   d) a wall with four segments around the platform, with a rear wall segment, a first side wall segment, a second side wall, segment, and a front wall segment, wherein the first side wall segment and the second side wall segment are configured to pivot towards the rear of the shopping cart, wherein the front wall segment is configured to be pivoted towards the platform so that the front wall segment rests on the platform;
   e) a first and a second bracket for attaching the handle to the platform at two separate positions on the handle, the handle pivotally attached to the first and second bracket, two of the wheels attached to the platform with a fastener through an opening in the bracket;
   wherein the shopping cart is collapsed by pivoting the first side wall segment, the second side wall segment, and the front wall segment, and then collapsing the shopping cart so that the handle pivots in relation to the bracket.

* * * * *